(No Model.)
W. H. ETZ & H. P. THEIS.
DINNER BUCKET.
No. 262,282. Patented Aug. 8, 1882.
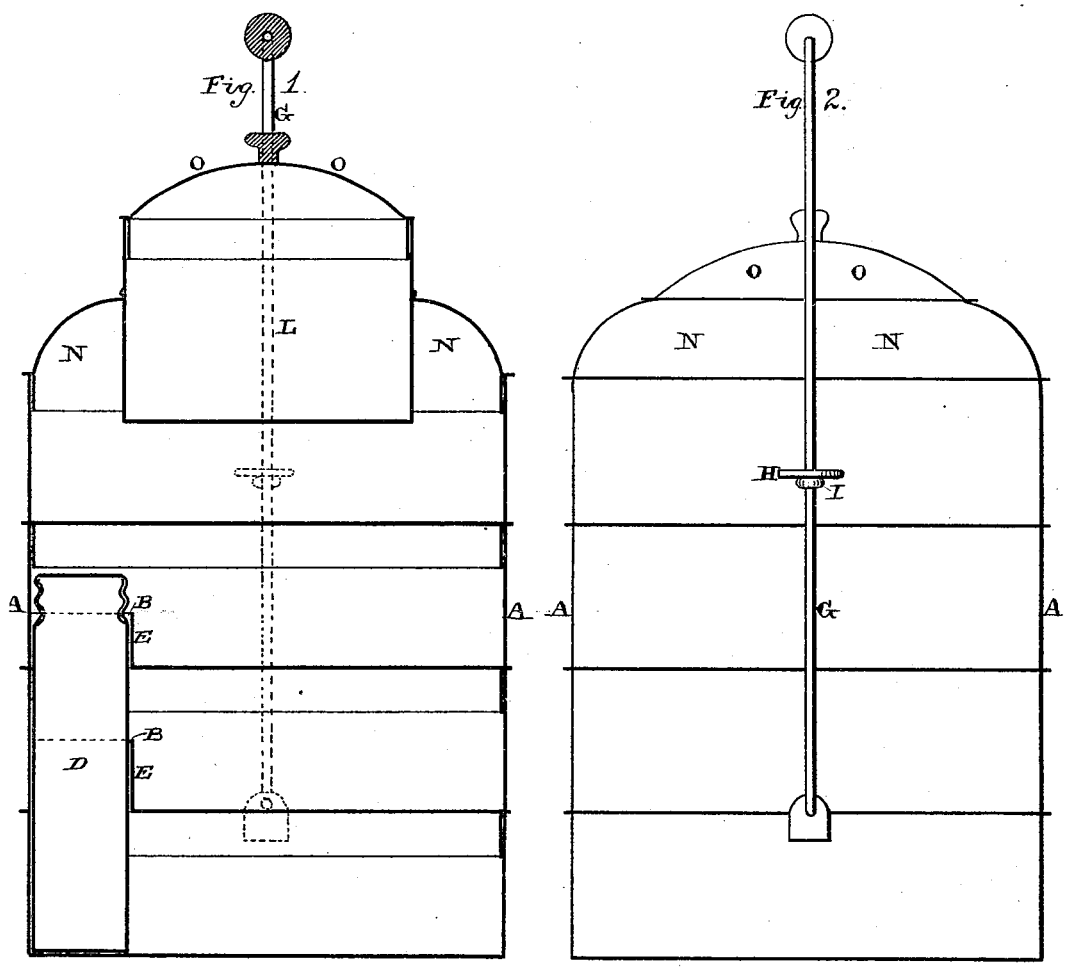
Fig. 3.
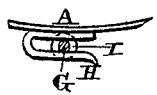
Witnesses.
Robt. Johnson.
L. S. Lehmann
Inventors.
W. H. Etz.
H. P. Theis.
per F. A. Lehmann, Atty.
N. PETERS. Photo-Lithographer, Washington, D.C.

UNITED STATES PATENT OFFICE.

WILLIAM H. ETZ AND HENRY P. THEIS, OF MARIETTA, OHIO.

DINNER-BUCKET.

SPECIFICATION forming part of Letters Patent No. 262,282, dated August 8, 1882.

Application filed June 22, 1882. (No model.)

*To all whom it may concern:*

Be it known that we, W. H. ETZ and H. P. THEIS, of Marietta, in the county of Washington and State of Ohio, have invented certain new and useful Improvements in Dinner-Buckets; and we do hereby declare the following to be a full, clear, and exact description of the invention, such as will enable others skilled in the art to which it pertains to make and use it, reference being had to the accompanying drawings, which form part of this specification.

Our invention relates to an improvement in dinner-buckets; and it consists in the combination of a bucket and a bottle for holding tea, coffee, or other liquids, and which is made to extend down through two or more sections of the bucket, but made entirely separate therefrom, so that it can be used for drinking from, or can be placed over the fire to be heated without having to heat any part of the bucket itself.

It further consists in the combination of a handle-rod, which is provided with suitable projections, with the upper section of the bucket, which has suitable hooks formed upon its opposite sides, and in which hooks the handle-rod is made to catch so as to hold the section together.

It still further consists in the combination of the top of the bucket with a removable cup which is passed down through it, which cup can be removed and the cover of the cup made to close the opening through which the cup was passed, whereby the bucket can be used either with or without the cup, all of which will be more fully described hereinafter.

The object of our invention is to provide a dinner-bucket in which the cup is made removable from the top, so as to enable the bucket to be used with or without the cup, and to enable the cup to be more freely used, and in which the sections are held together in such a manner that they cannot become detached when jolted or shaken.

Figure 1 is a vertical section of a bucket embodying our invention. Fig. 2 is a side elevation of the same with the cup removed. Fig. 3 is a detached view, showing the two hooks and the handle-rod passing through them.

A represents a dinner-bucket, which is composed of a number of sections, which are placed one upon the top of the other, in the usual manner. Through one side of the lower sections of the bucket is made a suitable opening, B, down through which is passed a bottle or similar vessel, D, for holding tea, coffee, or any other liquid. Each one of the sections has a flange, E, formed around the inner side of the opening, so as to prevent the contents of that section of the bucket from coming in contact with the bottle or falling through into the bottom of the bucket. This bottle, which may be of any shape desired, is made removable from the bucket, so that it can be placed over the fire to be heated without having to displace any part of the bucket, and so that it can be used to drink from. In order to hold the sections of the bucket together, the handle-rod G is fastened to the lower section in the usual manner; and fastened to the upper section upon opposite sides are the two hooks H. Fastened to the handle so that both will come above the hooks are the two projections I, which hold the top section down upon the others, so that they cannot become displaced until the section has been partially turned around, so as to release the handle-rod from the hooks. These hooks are closed sufficiently to prevent the handle-rod from becoming easily detached, and are turned in opposite directions. The handle-rod is held in an upright position and cannot become displaced or loosened by any jolting or shaking.

In order to enable the bucket to be used either with or without the cup L, the cup is made entirely detachable from the cover N. This cover has an opening through it, down through which the cup is passed, and the cover O of the cup is just large enough to fit the opening which is made for the cup. When the cup is removed the cover is to be taken from it and placed upon the top of the cover N, as shown in Fig. 2. By making the cup detachable, not only can the cup be more readily and freely used, but when it becomes injured, as it is sure to be when salted articles—such as butter—are placed in it, it can be readily replaced by another without having to renew the entire cover or require that the entire cover be sent away for repairs.

Having thus described our invention, we claim—

1. The combination, in a dinner-bucket, of two or more of the sections, having an opening made through them and provided with a flange, E, with a bottle which is passed down through them, substantially as shown.

2. In a dinner-bucket composed of a number of sections, the combination of a handle-rod provided with the projections I and the hooks which are placed upon opposite sides of the bucket, substantially as described.

3. The combination, in a dinner-bucket, of a number of sections, which are placed one upon the top of the other, with a handle-rod provided with projections I, and hooks, which are placed upon opposite sides of the bucket and which are turned in the same direction, substantially as set forth.

4. In a dinner-bucket, the combination of the cup L, the cover N, having an opening for the lower portion of the cup to pass through, and a cover for the cup, which is adapted to close the opening made through the cover N for the cup, substantially as specified.

In testimony whereof we affix our signatures in presence of two witnesses.

WILLIAM HENRY ETZ.
HENRY PHILIP THEIS.

Witnesses:
J. F. WEHRS,
FRED BLUME.